United States Patent
You et al.

(10) Patent No.: US 11,572,419 B2
(45) Date of Patent: Feb. 7, 2023

(54) METHOD FOR DECOLORIZING AND DEPROTEINIZING BROWN ALGAE POLYSACCHARIDES

(71) Applicant: South China University of Technology, Guangzhou (CN)

(72) Inventors: Lijun You, Guangzhou (CN); Xiaoyong Chen, Guangzhou (CN); Zhengang Zhao, Guangzhou (CN); Xiong Li, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 17/292,657

(22) PCT Filed: Aug. 18, 2020

(86) PCT No.: PCT/CN2020/109791
§ 371 (c)(1),
(2) Date: May 10, 2021

(87) PCT Pub. No.: WO2021/036864
PCT Pub. Date: Mar. 4, 2021

(65) Prior Publication Data
US 2022/0010035 A1    Jan. 13, 2022

(30) Foreign Application Priority Data

Aug. 29, 2019  (CN) .......................... 201910820755.9

(51) Int. Cl.
C08B 37/00      (2006.01)

(52) U.S. Cl.
CPC ...... *C08B 37/0003* (2013.01); *C08B 37/0063* (2013.01)

(58) Field of Classification Search
None
See application file for complete search history.

(56) References Cited

U.S. PATENT DOCUMENTS

| | | | |
|---|---|---|---|
| 4,104,460 A | * | 8/1978 | Hasebe ............... C08B 37/0084 435/267 |
| 2008/0032349 A1 | | 2/2008 | Viskov et al. |
| 2016/0082037 A1 | | 3/2016 | Kirsch et al. |

FOREIGN PATENT DOCUMENTS

| | | |
|---|---|---|
| CN | 1943803 A | 4/2007 |
| CN | 101307112 A | 11/2008 |
| CN | 105754000 A | 7/2016 |
| CN | 106883310 B | 6/2017 |
| CN | 107082822 B | 8/2017 |
| CN | 110078840 A | 8/2019 |
| WO | 2021036864 A1 | 3/2021 |

OTHER PUBLICATIONS

Tokumura, Water Research 40 (2006) 3775-3784. (Year: 2006).*
Written Opinion of International Application No. PCT/CN2020/109791, filed Aug. 18, 2020.
International Search Report for International Application No. PCT/CN2020/109791, filed Aug. 18, 2020.

* cited by examiner

*Primary Examiner* — Layla D Berry
(74) *Attorney, Agent, or Firm* — Peter J. Ims; Westman, Champlin & Koehler, P.A.

(57) ABSTRACT

A method for decolorizing and deproteinizing brown algae polysaccharides belongs to the field of deep processing of brown algae. The method combines ultraviolet (UV) with hydrogen peroxide ($H_2O_2$), including the following steps: extracting dried and pulverized brown algae by hot water to obtain brown algae polysaccharide, dissolving the brown algae polysaccharide in an aqueous solution containing $H_2O_2$ and irradiating under ultraviolet light, wherein the mass concentration of the brown algae polysaccharide is 2.5-10.0 mg/mL, the concentration of the $H_2O_2$ is 25-150 mmol/L, and the UV irradiation time is 1.0-2.0 h, so as to deproteinize and decolorize the brown algae. The invention does not use acids, bases and organic solvents, which is green with no pollution, simple in operation, safe, economical and time-saving.

9 Claims, 5 Drawing Sheets

METHOD FOR DECOLORIZING AND DEPROTEINIZING BROWN ALGAE POLYSACCHARIDES

CROSS-REFERENCE TO RELATED APPLICATIONS

This application is a Section 371 National Stage Application of International Application No. PCT/CN2020/109791, filed Aug. 18, 2020, the content of which is incorporated herein by reference in its entirety, and published as WO 2021/036864 A1 on Mar. 4, 2021, not in English.

TECHNICAL FIELD

The invention belongs to the technical field of polysaccharide separation and purification, and specifically relates to a method for decolorizing and deproteinizing brown algae polysaccharides.

BACKGROUND

Polysaccharides are natural macromolecular carbohydrates composed of at least 10 monosaccharides, which can be divided into plant polysaccharides, animal polysaccharides and microbial polysaccharides according to their sources. Brown algae are high level algae with about 1,500 species. The commonly seen brown algae in China include *Laminaria japonica, Undaria pinnatifida, Macrocystis pyrifera, Ectocarpus confervoides, Sphaerotrichia, Desmarestia viridis, Scytosiphon lomentaria, Colpomenia sinuosa, Chorda filum, Myosoton aquaticum, Dictyota dichotoma, Padina, Sargassum, Silvetia siliquosa, Sargassum pallidum, Sargassum muticum*, and *Sargassum fusiforme*. etc., which are important sources of plant polysaccharides. At present, brown algae in China are mainly used to produce algin, which is widely used in industry, but recent studies have shown that brown algae polysaccharides have a variety of biological activities, such as anti-oxidation, anti-coagulation, anti-virus, hypoglycemic effect, immune regulation, and so on, and thus they have gradually been noticed by researchers. However, brown algae polysaccharides are often mixed with impurities such as proteins and pigments, which hinder the purification, classification, structure identification, and pharmacological activity analysis of the polysaccharides. In addition, the commonly used decolorization methods such as activated carbon method, hydrogen peroxide method and macroporous resin method and deproteinization methods such as Sevage method, sodium chloride method, calcium chloride method, trichloroacetic acid method and hydrochloric acid method have many shortcomings including too many repetitions, cumbersome operation, large loss of polysaccharide components, low purity, or the use of acids and organic solvents. Therefore, how to remove impurities such as proteins and pigments conveniently, effectively and environmentally has become a hot issue in the study of brown algae polysaccharides.

In addition to the traditional decolorization and deproteinization methods, the currently studied decolorization and deproteinization methods includes that: CN201710249849.6 discloses a purification method for decolorizing and deproteinizing champion bean polysaccharides, which is mainly based on D113 weakly acidic cation exchange resin to achieve decolorization and deproteinization; CN201710394098.7 discloses a method for deproteinizing and decolorizing polysaccharides in the by-product of mango processing, which mainly comprises deproteinizing by TCA combined with n-butanol, and then further decolorizing by activated carbon.

At present, the decolorization effect of $H_2O_2$ alone has been confirmed, but in order to achieve a more ideal decolorization effect, a higher concentration of $H_2O_2$ is often required; in addition, there are no reports about using either UV or $H_2O_2$ and UV combined with $H_2O_2$ for simultaneous decolorization and deproteinization.

SUMMARY

In view of the existing problems in the separation and purification of brown algae polysaccharides, a purpose of the present invention is to provide a method for decolorization and deproteinization in the purification process of brown algae polysaccharides to solve the above problems. The whole process does not use acids, bases and organic solvents, which is green with no pollution, simple in operation, safe, fast, and has good decolorization and deproteinization effects.

The purpose of the present invention is achieved by the following technical solutions.

A method for decolorizing and deproteinizing brown algae polysaccharides comprises dissolving the brown algae polysaccharides in water, adding a hydrogen peroxide solution, and placing the resulting mixed solution under ultraviolet light for decolorization and deproteinization.

Preferably, the brown algae polysaccharides are prepared by hot water extraction, acid-base extraction, ultrasonic-assisted extraction, microwave-assisted extraction, or biological enzymatic extraction.

Preferably, the brown algae is at least one of *Laminaria japonica, Undaria pinnatifida, Macrocystis pyrifera, Ectocarpus confervoides, Sphaerotrichia, Desmarestia viridis, Scytosiphon lomentaria, Colpomenia sinuosa, Chorda filum, Myosoton aquaticum, Dictyota dichotoma, Padina, Sargassum, Silvetia siliquosa, Sargassum pallidum, Sargassum muticum*, and *Sargassum fusiforme*.

Preferably, preparation of the brown algae polysaccharides comprises the following steps:

(1) raw material pretreatment: pulverizing washed and dried brown algae, refluxing with ethanol, centrifuging to collect the precipitate and drying to obtain brown algae powder;

(2) extraction of brown algae polysaccharides: extracting the brown algae powder pretreated in step (1) by hot water, centrifuging and removing the residue; concentrating the obtained supernatant by a vacuum rotary evaporator, adding ethanol, shaking to mix uniformly, standing, centrifuging again and removing the supernatant; washing the obtained precipitate with ethanol, dissolving again in water, concentrating by a vacuum rotary evaporator and lyophilizing to obtain the brown algae polysaccharides.

More preferably, the concentration of the ethanol is 95 vol %.

More preferably, the temperature of the standing in step (2) is 4° C.

More preferably, in the hot water extraction of step (2), the ratio of material-to-liquid is 1 g:30 mL-1 g:50 mL, the extraction temperature is 60-100° C., and the extraction time is 4-6 h.

Preferably, the concentration of the brown algae polysaccharides in the mixed solution is 2.5-10 mg/mL.

Preferably, the concentration of the hydrogen peroxide in the mixed solution is 25-150 mmol/L, more preferably 100-150 mmol/L.

Preferably, the irradiation intensity of the ultraviolet light is 4000-7000 mJ/cm$^2$.

Preferably, the irradiation time of the ultraviolet light is 1.0-2.0 h.

Preferably, a method for decolorizing and deproteinizing brown algae polysaccharides includes the following steps:

(1) Raw material pretreatment: washed and dried brown algae (such as *Laminaria japonica*, *Undaria pinnatifida*, *Macrocystis pyrifera*, *Ectocarpus confervoides*, *Sphaerotrichia*, *Desmarestia viridis*, *Scytosiphon lomentaria*, *Colpomenia sinuosa*, *Chorda filum*, *Myosoton aquaticum*, *Dictyota dichotoma*, *Padina*, *Sargassum*, *Silvetia siliquosa*, *Sargassum pallidum*, *Sargassum muticum*, and *Sargassum fusiforme*, etc.) are pulverized, refluxed with 95% ethanol to remove lipids and other small molecules, centrifuged to collect the precipitate, and the precipitate is dried for later use.

(2) Extraction of brown algae polysaccharides: polysaccharides are extracted from the pretreated brown algae powder by hot water, wherein the extraction conditions includes: a material-to-liquid ratio of 1:30-1:50 (g/mL), an extraction temperature of 60-100° C., and an extraction time of 4-6 hours. The supernatant obtained from the centrifugation of the extract is concentrated by a vacuum rotary evaporator followed by slowly adding an appropriate amount of 95% ethanol. The mixture is shaken to mix uniformly and allowed to stand overnight at 4° C. Centrifugation is carried out on the next day, and the supernatant is removed; the precipitate is washed with 95% ethanol followed by dissolving again in an appropriate amount of pure water, and finally concentrated by a vacuum rotary evaporator and lyophilized to obtain the brown algae polysaccharides.

(3) decolorization and deproteinization treatment: an appropriate amount of the brown algae polysaccharides is dissolved in pure water, and an appropriate amount of $H_2O_2$ is added, so that the final concentration of the brown algae polysaccharides in the solution is 2.5-10 mg/mL, and the final concentration of $H_2O_2$ in the solution is 25-150 mmol/L. Then the solution is placed under ultraviolet light for decolorization and deproteinization.

The invention combines UV with $H_2O_2$ to remove pigments and proteins in brown algae polysaccharides, wherein no organic solvents are involved in the operation. The method is safe, environmentally friendly, low cost, simple and time-saving in operation, and has good decolorization and deproteinization effects as well as good application prospect.

Compared with the prior art, the present invention has the following beneficial effects:

The materials used in the method of decolorizing and deproteinizing brown algae polysaccharides of the present invention and their dosages are reasonable, so that the decolorization and deproteinization can be carried out at the same time with simple operation, mild condition, no pollution, and outstanding decolorization and deproteinization effects of brown algae polysaccharides. The decolorization rate of *Sargassum fusiforme* polysaccharide is up to 92.26%, and the protein content of the brown algae polysaccharides is down to 9.75 μg/mL after being processed by the method of the present invention.

DETAILED DESCRIPTION OF ILLUSTRATIVE EMBODIMENTS

The technical solutions of the present invention are described in detail below through embodiments, but the technical solutions of the present invention are not limited to the following embodiments.

Example 1

*Sargassum fusiforme* polysaccharides were decolorized and deproteinized by a UV/$H_2O_2$ method including the following steps:

(1) After the washed and dried *Sargassum fusiforme* is superfinely pulverized, 100 g of it was mixed with 400 mL of 95 vol % ethanol and refluxed for 3 times in a slightly boiling state for a total of 5 hours to remove lipids, pigments and small molecules. Then centrifugation was carried out, the precipitate was collected and dried to obtain the pretreated *Sargassum fusiforme* superfine powder.

(2) After the pretreatment, the superfine *Sargassum fusiforme* powder was extracted by hot water at a material-liquid ratio of 1 g:50 mL. The extraction was under 100° C. for 4 h, and the extract was centrifuged to obtain the supernatant. The supernatant was concentrated by a vacuum rotary evaporator, and then 95 vol % ethanol was slowly added to reach a final concentration of 80 wt %. The solution was shaken to mix uniformly, and then allowed to stand at 4° C. for 12 h. Centrifugation was carried out on the next day, the supernatant was removed, and the precipitate was washed with 95 vol % ethanol followed by standing at room temperature. After the ethanol was volatilized, an appropriate amount of pure water was added to dissolve the precipitate again, and finally the solution was concentrated by a vacuum rotary evaporator and lyophilized to obtain the *Sargassum fusiforme* polysaccharides.

(3) an appropriate amount of *Sargassum fusiforme* polysaccharides obtained above was dissolved in pure water containing $H_2O_2$ so that the final concentration of the polysaccharides was 2.5 mg/mL and the final concentration of $H_2O_2$ was 25, 75 and 150 mmol/L. Then the solution was placed under ultraviolet light for decolorization and deproteinization for 2 h, wherein the irradiation intensity was 6500 mJ/cm². Then the decolorization and deproteinization rates before and after UV/$H_2O_2$ treatment were measured. In addition, in order to further evaluate the enhancement effect of combining UV with $H_2O_2$, the decolorization and deproteinization effects of *Sargassum fusiforme* polysaccharide after UV treatment or $H_2O_2$ treatment alone were further determined.

Figure 1:
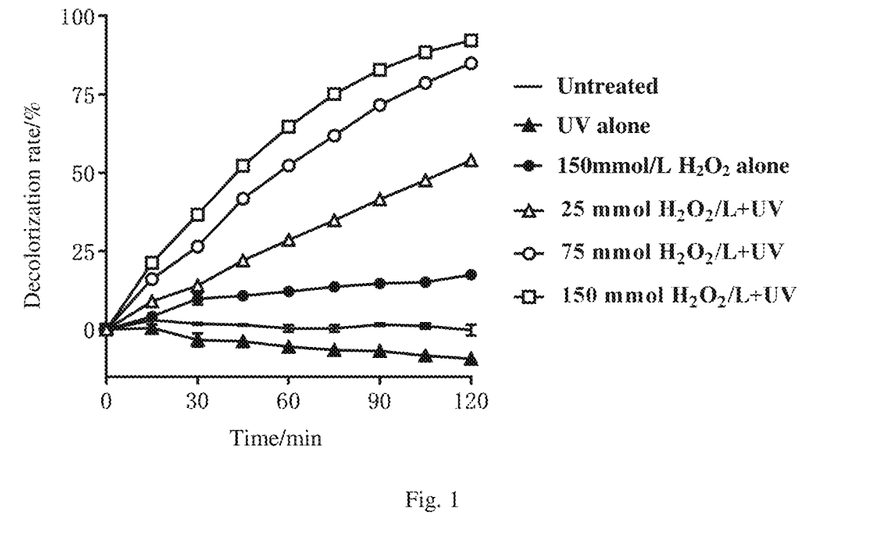
FIG. 1 is a graph showing the variation of decolorization rate of *Sargassum fusiforme* polysaccharides treated with UV/$H_2O_2$ for different time in Example 1.

(4) Detection of decolorization and deproteinization effects of *Sargassum fusiforme* polysaccharide solution by the UV/$H_2O_2$ method:

Decolorization rate detection: the wavelength of 420 nm is often used in the study of the decolorization rate of polysaccharides; appropriate amounts of the polysaccharide solutions treated for different time were centrifuged at 12000 r/min for 30 sec, and the absorbances at 420 nm were measured. The decolorization rate is calculated according to the following formula, the results being shown in FIG. 1.

$$\text{decolorization rate}(\%) = \frac{\text{absorbance before decolorization } A_0 - \text{absorbance after decolorization } A_t}{\text{absorbance before decolorization } A_0} \times 100$$

Figure 2A:
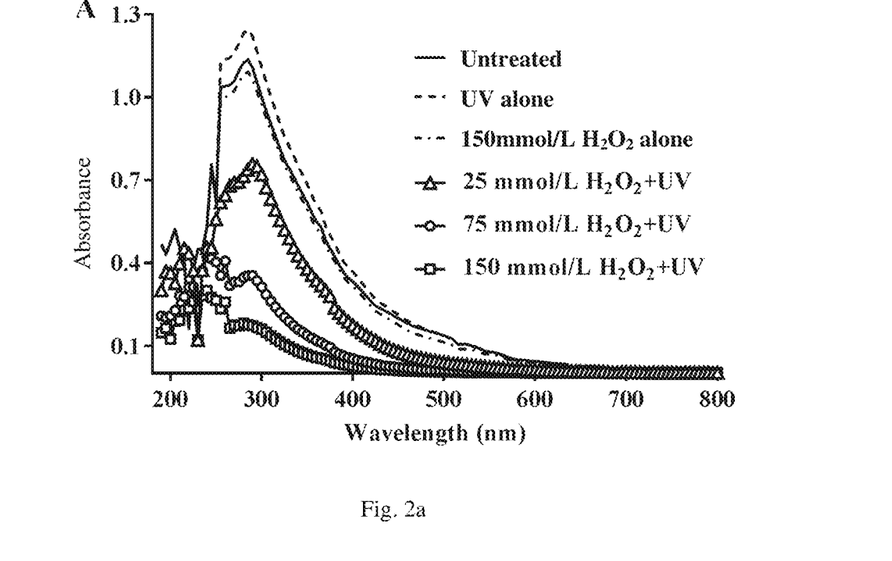
FIG. 2a is a graph showing the full-wavelength scanning results indicating the protein content of the *Sargassum fusiforme* polysaccharide solution treated with UV/$H_2O_2$ in Example 1.
Figure 2B:
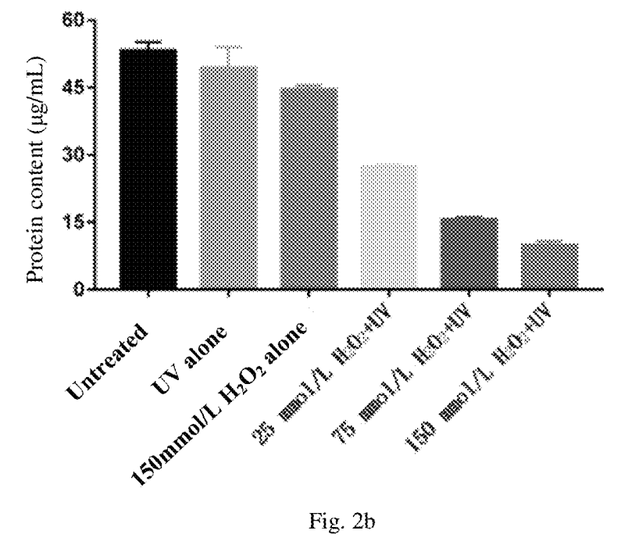
FIG. 2b is the result of the Coomassie Brilliant Blue method indicating the protein content of the *Sargassum fusiforme* polysaccharide solution treated with UV/$H_2O_2$ in Example 1.

Deproteinization detection: protein has a maximum absorption peak at a wavelength of 280 nm; at the same concentration, the absorbance indicates the concentration of the protein. Therefore, the absorbance at the wavelength of 280 nm can be used as one of the evaluation indicators of the deproteinization ability. Ultraviolet-visible spectrophotometer was used to scan through a wavelength range of 200-800 nm. The result is shown in FIG. 2a. In addition, the protein content was further determined by the Coomassie Brilliant Blue method, and the results are shown in FIG. 2b.

It can be seen from FIG. 1 that compared with the untreated *Sargassum fusiforme* polysaccharide solution, the color of the polysaccharides becomes darker after UV treatment alone, while the color of the polysaccharide solution becomes lighter after the 150 mmol/L of $H_2O_2$ treatment alone, indicating that it has a certain effect on decolorization of the *Sargassum fusiforme* polysaccharide solution. In the cases of treating with 25, 75 and 150 mmol/L of $H_2O_2$ combined with UV, the decolorization rates increase greatly. With the increase of $H_2O_2$ concentration, the decolorization effect is better, indicating that the treatment combining $H_2O_2$ with UV is a feasible and effective decolorization method for *Sargassum fusiforme* polysaccharides.

Protein has a maximum absorption peak at a wavelength of 280 nm; at the same concentration, the absorbance indicates the concentration of the protein. It can be seen from FIG. 2a that, compared with the untreated *Sargassum fusiforme* polysaccharide solution, the absorbances at 280 nm do not change significantly after UV treatment alone and 150 mmol/L of $H_2O_2$ treatment alone, while after treating with 25, 75 and 150 mmol/L of $H_2O_2$ combined with UV, the absorbances at 280 nm of the *Sargassum fusiforme* polysaccharide solution are greatly reduced, indicating that the protein contents in the solution are reduced. Further determination by the Coomassie brilliant blue method (FIG. 2b) shows that the protein contents in the solutions after UV treatment alone and 150 mmol/L of $H_2O_2$ treatment alone do not change significantly compared to that of the untreated solution, but in the cases of treating with 25, 75 and 150 mmol/L of $H_2O_2$ combined with UV, the protein contents decrease significantly, which is consistent with the full-wavelength scan results. And as the concentration of $H_2O_2$ increases, the protein content decreases. In summary, the treatment combining $H_2O_2$ with UV is a feasible and effective method for deproteinizing *Sargassum fusiforme* polysaccharides.

Example 2

*Laminaria japonica* polysaccharide solution was decolorized and deproteinized by a UV/$H_2O_2$ method including the following steps:

(1) After the washed and dried *Laminaria japonica* was pulverized, 100 g of it was mixed with 400 mL of 95 vol % ethanol and refluxed for 2 times in a slightly boiling state for a total of 3 hours to remove lipids, pigments and small molecules. Then centrifugation was carried out, the precipitate was collected and dried to obtain the pretreated *Laminaria japonica* powder.

(2) After the pretreatment, the *Laminaria japonica* powder was extracted by hot water at a material-liquid ratio of 1 g:30 mL. The extraction was under 60° C. for 4 h, and the extract was centrifuged to obtain the supernatant. The supernatant was concentrated by a vacuum rotary evaporator, and then 95 vol % ethanol was slowly added to reach a final concentration of 80 wt %. The solution was shaken to mix uniformly, and then allowed to stand at 4° C. for 12 h. Centrifugation was carried out on the next day, the supernatant was removed, and the precipitate was washed with 95 vol % ethanol followed by standing at room temperature. After the ethanol was volatilized, an appropriate amount of pure water was added to dissolve the precipitate again, and finally the solution was concentrated by a vacuum rotary evaporator and lyophilized to obtain the *Laminaria japonica* polysaccharides.

(3) an appropriate amount of *Laminaria japonica* polysaccharides obtained above was dissolved in pure water containing $H_2O_2$ so that the final concentration of the polysaccharides was 5.0 mg/mL and the final concentration of $H_2O_2$ was 25, 50 and 75 mmol/L. Then the solution was placed under ultraviolet light for decolorization and deproteinization for 1 h, wherein the irradiation intensity was 6500 mJ/cm². Then the decolorization and deproteinization rates before and after UV/$H_2O_2$ treatment were measured. In addition, in order to further evaluate the enhancement effect of combining UV with $H_2O_2$, the decolorization and deproteinization effects of *Laminaria japonica* polysaccharide after UV treatment or $H_2O_2$ treatment alone were further determined.

(4) Detection of decolorization and deproteinization effects of *Laminaria japonica* polysaccharide solution by the UV/$H_2O_2$ method was carried out according to step (4) of Example 1. The result of decolorization rate is shown in FIG. 3, and the result of deproteinization is shown in FIG. 4a and FIG. 4b.

Figure 3:
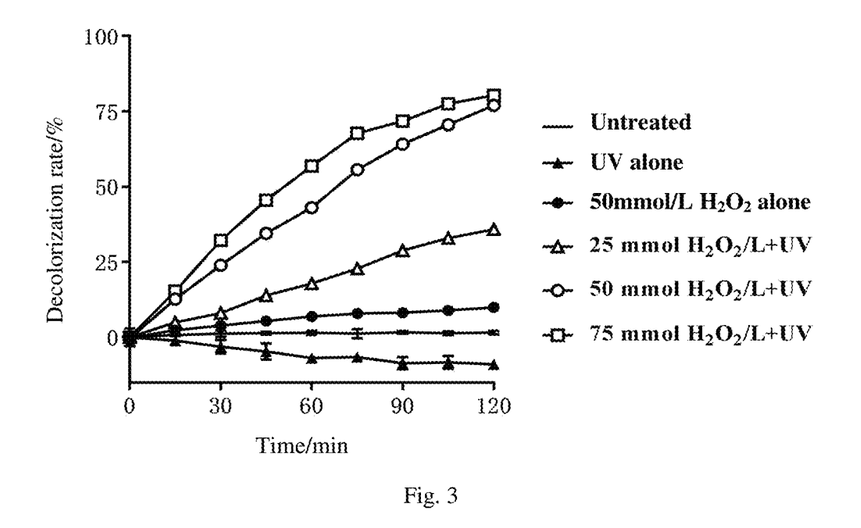
FIG. 3 is a graph showing the variation of decolorization rate of *Laminaria japonica* polysaccharides treated with UV/$H_2O_2$ for different time in Example 2.
Figure 4A:
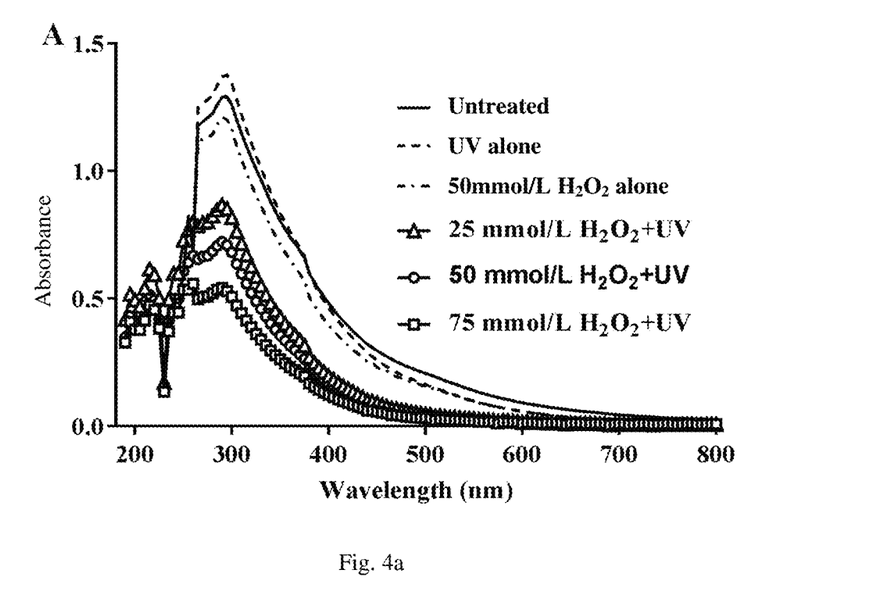
FIG. 4a is a graph showing the full-wavelength scanning results indicating the protein content of the *Laminaria japonica* polysaccharide solution treated with UV/$H_2O_2$ in Example 2.
Figure 4B:
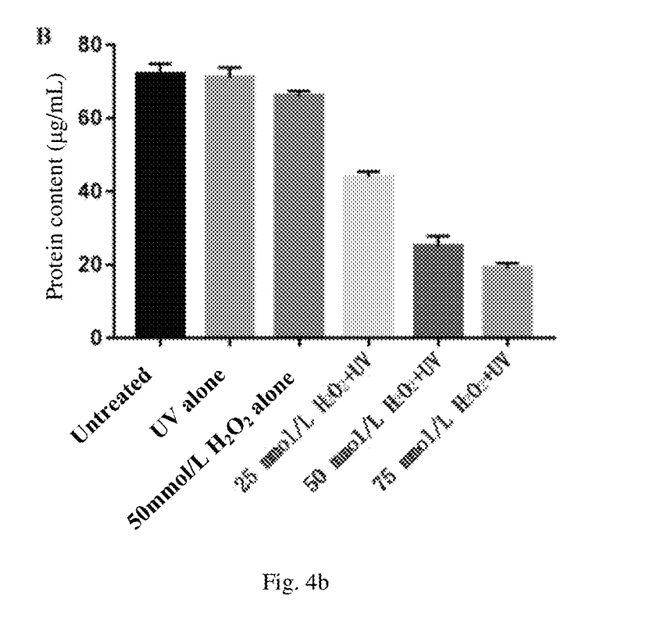
FIG. 4b is the result of the Coomassie Brilliant Blue method indicating the protein content of the *Laminaria japonica* polysaccharide solution treated with UV/$H_2O_2$ in Example 2.

It can be seen from FIG. 3 that compared with the untreated *Laminaria japonica* polysaccharide solution, the color of the polysaccharides becomes darker after UV treatment alone, while the color of the polysaccharide solution becomes lighter after the 50 mmol/L of $H_2O_2$ treatment alone, indicating that it has a certain effect on decolorization of the *Laminaria japonica* polysaccharide solution. In the cases of treating with 25, 50 and 75 mmol/L of $H_2O_2$ combined with UV, the decolorization rates increase greatly. With the increase of $H_2O_2$ concentration, the decolorization effect is better, indicating that the treatment combining $H_2O_2$ with UV is a feasible and effective decolorization method for *Laminaria japonica* polysaccharides.

Example 3

*Undaria pinnatifida* polysaccharide solution was decolorized and deproteinized by a UV/$H_2O_2$ method including the following steps:

(1) After the washed and dried *Undaria pinnatifida* was pulverized, 40 g of it was mixed with 1000 mL of 95 vol % ethanol and refluxed in a slightly boiling state for a total of 3 hours to remove lipids, pigments and small molecules. Then centrifugation was carried out, the precipitate was collected and dried to obtain the pretreated *Undaria pinnatifida* powder.

(2) After the pretreatment, the *Undaria pinnatifida* powder was extracted by hot water at a material-liquid ratio of 1 g:40 mL. The extraction was under 100° C. for 4 h, and the extract was centrifuged to obtain the supernatant. The supernatant was concentrated by a vacuum rotary evaporator, and then 95 vol % ethanol was slowly added to reach a final concentration of 80 wt %. The solution was shaken to mix uniformly, and then allowed to stand at 4° C. for 12 h. Centrifugation was carried out on the next day, the supernatant was removed, and the precipitate was washed with 95 vol % ethanol followed by standing at room temperature. After the ethanol was volatilized, an appropriate amount of pure water was added to dissolve the precipitate again, and finally the solution was concentrated by a vacuum rotary evaporator and lyophilized to obtain the *Undaria pinnatifida* polysaccharides.

(3) an appropriate amount of *Undaria pinnatifida* polysaccharides obtained above was dissolved in pure water containing $H_2O_2$ so that the final concentration of the polysaccharides was 10.0 mg/mL and the final concentration of $H_2O_2$ was 25, 50 and 100 mmol/L. Then the solution was placed under ultraviolet light for decolorization and deproteinization for 2 h, wherein the irradiation intensity was 6500 mJ/cm$^2$. Then the decolorization and deproteinization rate before and after UV/$H_2O_2$ treatment was measured.

(4) Detection of decolorization and deproteinization effects of *Undaria pinnatifida* polysaccharide solution by the UV/$H_2O_2$ method was carried out according to step (4) of Example 1. The result of decolorization rate is shown in FIG. 5, and the result of deproteinization is shown in FIG. 6a and FIG. 6b.

Figure 5:
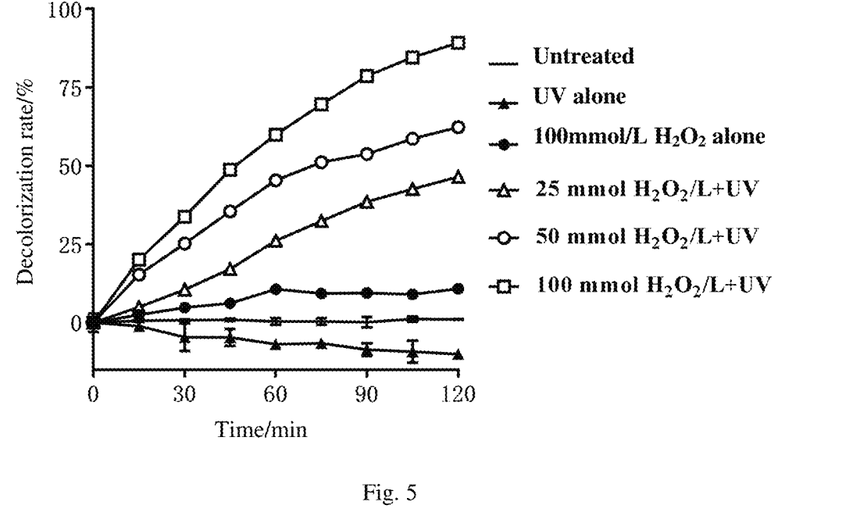
FIG. 5 is a graph showing the variation of decolorization rate of *Undaria pinnatifida* polysaccharides treated with UV/$H_2O_2$ for different time in Example 3.
Figure 6A:
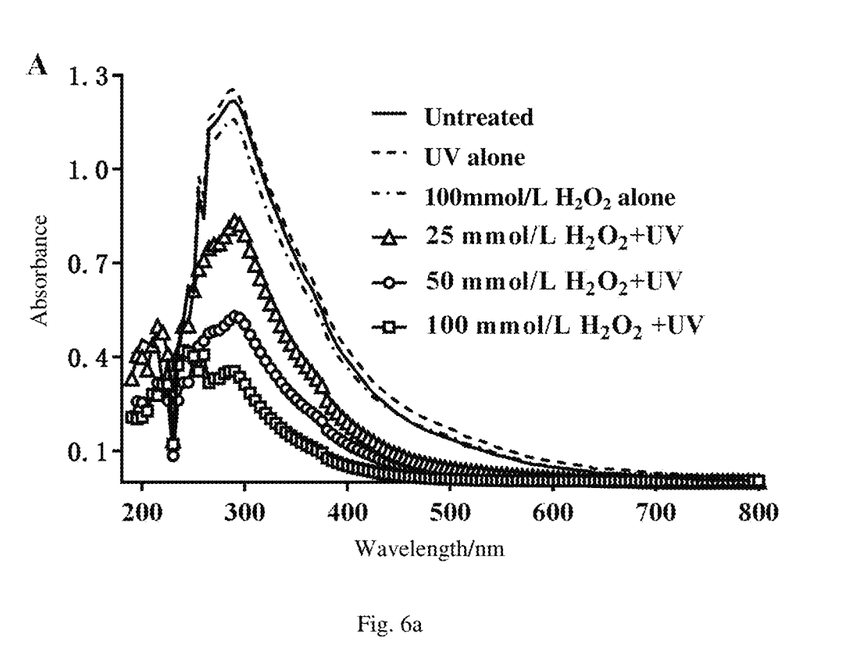
FIG. 6a is a graph showing the full-wavelength scanning results indicating the protein content of the *Undaria pinnatifida* polysaccharide solution treated with UV/$H_2O_2$ in Example 3.
Figure 6B:
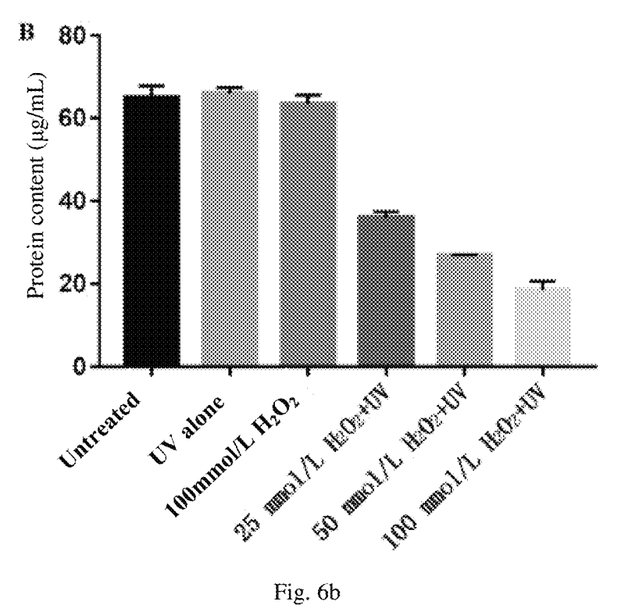
FIG. 6b is the result of the Coomassie Brilliant Blue method indicating the protein content of the *Undaria pinnatifida* polysaccharide solution treated with UV/$H_2O_2$ in Example 3.

It can be seen from FIG. 5 that compared with the untreated *Undaria pinnatifida* polysaccharide solution, the color of the polysaccharides becomes darker after UV treatment alone, while the color of the polysaccharide solution becomes lighter after the 100 mmol/L of $H_2O_2$ treatment alone, indicating that it has a certain effect on decolorization of the *Undaria pinnatifida* polysaccharide solution. In the cases of treating with 25, 50 and 100 mmol/L of $H_2O_2$ combined with UV, the decolorization rates increase greatly. With the increase of $H_2O_2$ concentration, the decolorization effect is better, indicating that the treatment combining $H_2O_2$ with UV is a feasible and effective decolorization method for *Undaria pinnatifida* polysaccharides.

Protein has a maximum absorption peak at a wavelength of 280 nm; at the same concentration, the absorbance indicates the concentration of the protein. It can be seen from FIG. 4a that, compared with the untreated *Laminaria japonica* polysaccharide solution, the absorbances at 280 nm do not change significantly after UV treatment alone and 50 mmol/L of $H_2O_2$ treatment alone, while after treating with 25, 50 and 75 mmol/L of $H_2O_2$ combined with UV, the absorbances at 280 nm of the *Laminaria japonica* polysaccharide solution are greatly reduced, indicating that the protein contents in the solution are reduced. Further determination by the Coomassie brilliant blue method (FIG. 4b) shows that the protein contents in the solution after UV treatment alone and 50 mmol/L of $H_2O_2$ treatment alone do not change significantly compared to that of the untreated solution, but in the cases of treating with 25, 50 and 75 mmol/L of $H_2O_2$ combined with UV, the protein contents decrease significantly, which is consistent with the full-wavelength scan results. And as the concentration of $H_2O_2$ increases, the protein content decreases. In summary, the treatment combining $H_2O_2$ with UV is a feasible and effective method for deproteinizing *Laminaria japonica* polysaccharides.

Although the embodiments of the present disclosure have been described with reference to preferred embodiments, workers skilled in the art will recognize that changes may be made in form and detail without departing from the spirit and scope of the present disclosure.

The invention claimed is:

1. A method for decolorizing and deproteinizing brown algae polysaccharides, wherein the brown algae polysaccharides are prepared by hot water extraction, acid-base extraction, ultrasonic-assisted extraction, microwave-assisted extraction, or biological enzymatic extraction, wherein the method comprises dissolving the brown algae polysaccharides in water, adding a hydrogen peroxide solution, and placing the resulting mixed solution under ultraviolet light for decolorization and deproteinization.

2. The method of claim 1, wherein the brown algae is at least one of *Laminaria japonica, Undaria pinnatifida, Macrocystis pyrifera, Ectocarpus confervoides, Sphaerotrichia, Desmarestia viridis, Scytosiphon lomentaria, Colpomenia sinuosa, Chorda filum, Myosoton aquaticum, Dictyota dichotoma, Padina, Sargassum, Silvetia siliquosa, Sargassum pallidum, Sargassum muticum*, and *Sargassum fusiforme*.

3. The method of claim 1, wherein the hot water extraction of the brown algae polysaccharides comprises the following steps:
   (1) raw material pretreatment: pulverizing washed and dried brown algae, refluxing with ethanol, centrifuging to collect the precipitate and drying to obtain brown algae powder; and
   (2) extraction of brown algae polysaccharides: extracting the brown algae powder pretreated in step (1) by hot water, centrifuging and removing the residue; concentrating the obtained supernatant, adding ethanol, shaking to mix uniformly, standing, centrifuging again and removing the supernatant; washing the obtained precipitate with ethanol, dissolving again in water, concentrating and lyophilizing to obtain the brown algae polysaccharides.

4. The method of claim 3, wherein in the hot water extraction of step (2), the ratio of material-to-liquid is 1 g:30 mL-1 g:50 mL, the extraction temperature is 60-100° C., and the extraction time is 4-6 h.

5. The method of claim 1, wherein the concentration of the brown algae polysaccharides in the mixed solution is 2.5-10 mg/mL.

6. The method of claim 1, wherein the concentration of the hydrogen peroxide in the mixed solution is 25-150 mmol/L.

7. The method of claim 6, wherein the concentration of the hydrogen peroxide in the mixed solution is 100-150 mmol/L.

8. The method of claim 1, wherein the irradiation intensity of the ultraviolet light is 4000-7000 mJ/cm$^2$.

9. The method of claim 1, wherein the irradiation time of the ultraviolet light is 1.0-2.0 h.

* * * * *